US006978668B2

(12) United States Patent  
Starinshak

(10) Patent No.: US 6,978,668 B2
(45) Date of Patent: Dec. 27, 2005

(54) FLEXIBLE TINSEL RIBBON ANTENNA AND ASSEMBLY METHOD FOR A TIRE

(75) Inventor: Thomas Walter Starinshak, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 69 days.

(21) Appl. No.: 10/745,307

(22) Filed: Dec. 22, 2003

(65) Prior Publication Data

US 2005/0132790 A1    Jun. 23, 2005

(51) Int. Cl.[7] .............................................. E01C 23/00
(52) U.S. Cl. ....................................................... 73/146
(58) Field of Search .............................. 73/146–146.8; 340/7; 152/152.1

(56) References Cited

U.S. PATENT DOCUMENTS

2004/0159383 A1 * 8/2004 Adamson et al. ......... 152/152.1

* cited by examiner

Primary Examiner—Max Noori
(74) Attorney, Agent, or Firm—Richard B. O'Planick

(57) ABSTRACT

An antenna system and method for tire monitoring systems provides a flexible conductor having sufficient elongation characteristics as an antenna in a tire monitoring sensor system. A conductive strand is formed by wrapping a conductive tinsel ribbon around an extensible strength member. One or more conductive strands are combined to form an antenna cable that affixes to the inner liner of a tire. According to one aspect of the invention a conductive strand is formed by spiral wrapping at least one conductive tinsel ribbon around the strength member. According to another aspect of the invention, multiple tinsel ribbons may be wrapped around the strength member in braided fashion.

14 Claims, 2 Drawing Sheets

FLEXIBLE TINSEL RIBBON ANTENNA AND ASSEMBLY METHOD FOR A TIRE

FIELD OF THE INVENTION

The invention relates generally to an apparatus, including an antenna and a transponder, for a tire pressure monitoring system and, more specifically, to an elongated annular apparatus for incorporation into a tire pressure monitoring system.

BACKGROUND OF THE INVENTION

It is common to employ annular apparatus, including an antenna, for electronically transmitting tire or wheel identification or other data at radio frequency. The apparatus includes a radio-frequency transponder comprising an integrated circuit chip having data capacity at least sufficient to retain identification information for the tire or wheel. Other data, such as the inflation pressure of the tire or the temperature of the tire or wheel at the transponder location, can be transmitted by the transponder along with the identification data.

It is known in the art to employ an annular antenna to transmit, at radio frequencies, data from a transponder contained within the structure of a tire or tire and wheel assembly. The antenna comprises a wire or strands of wire formed into a loop that may be sheathed in an extruded covering formed from a suitable material such as plastic. The plastic sheath in combination with the antenna form a unitary body that may be affixed to a green tire in a pre-build assembly process or attached to a finished tire in a post-cure operation. While the antenna and transponder may be incorporated into a tire during "pre-cure" manufacture, in practice it is very difficult to do this. Both radial ply and bias ply tires undergo a substantial diametric enlargement during the course of manufacture. Bias ply tires are expanded diametrically when inserted into a curing press, which typically has a bladder that forces the green tire into the toroidal shape of the mold enclosing it. Radial ply tires undergo diametric expansion during the tire building or shaping process and a further diametric expansion during the course of curing. Any annular antenna and the electronic circuitry associated therewith built into the tire must be able to maintain structural integrity and the mechanical connection between the antenna and transponder package during the diametric enlargement of the tire during its manufacture. Once assembled into the tire, any detected malfunction in the antenna, transponder, or antenna to transponder connection that cannot be repaired destroys the utility of the tire and may necessitate a scrapping of the tire. Hence, placement of an annular antenna-transponder assembly into a tire during its manufacture carries risk that subsequent failure or breakage of assembly components will necessitate the destruction of the otherwise suitable host tire.

Not only is the risk of damage to an annular antenna-transponder system present during its incorporation into a tire during manufacture, but damage to such systems are not uncommon from operation of the tire on a vehicle. Loop antennas and the electronics associated therewith are subjected to substantial compressive strain and at the sidewall a high strain amplitude. Such locations represent high load and deformation to regions of the tire. Consequently, antenna, transponders, and the connections therebetween in such locations are prone to breakage and mechanical or electrical failure.

There is, accordingly, a continuing need for an antenna apparatus suitable for incorporation into a tire either in a pre-cure or post-cure procedure. The antenna apparatus must provide sufficient structural integrity to withstand the stresses attendant tire building processes and post-manufacture use on a vehicle. Moreover, the antenna apparatus ideally will maintain its optimal, intended configuration and shape throughout the tire build operation and subsequent use on a vehicle. Since the performance of the tire pressure monitoring system is dependent upon efficient communication between the tire electronics and a remote reader via the antenna, maintaining the antenna in an optimal configuration is highly desirable. Finally, a suitable antenna apparatus will provide the requisite level of conductance required to convey signals to and from a transponder in a tire monitoring sensor system.

SUMMARY OF THE INVENTION

The subject invention overcomes the fatigue deficiencies in known antenna systems and methods for tire monitoring systems by providing and utilizing a flexible conductor having sufficient elongation characteristics as an antenna in a tire monitoring sensor system. The antenna cable is formed from a conductive metal tinsel made by first rolling a wire into a flat ribbon. One or more ribbons are closely spiraled around a textile strength member to form the antenna conductor or strand. According to one aspect of the invention, several of the antenna conductor strands are twisted together to form the complete tinsel antenna cable. According to another aspect of the invention, the tinsel ribbons may be wrapped around a strength member in braided fashion. When subjected to forces of external origin, the tinsel ribbons can slightly elongate with the strength member. The elongation is dependent on the textile strength member. Partially oriented textiles such as nylon and polyester can elongate by about 10%, others such as cotton and Kevlar elongate very little, while Spandex fabric has tremendous elongation. When Spandex is employed, release from the influence of such forces, residual elastomeric spring forces within the strength member return the strength member and the conductive tinsel ribbon antenna carried thereby back to its original, optimal configuration. For some of the other less elongating textile members the tinsel antenna cable would have to be applied to tire in a sinusoidal manner. Further, the fibers' strength members can be twisted together to increase their elongation before applying the tinsel ribbon. The extensible strength member protects the integrity of the conductive tinsel ribbon antenna; allows the unitary assembly to be conveniently transported and inventoried; improves the metal fatigue resistance of the assembly; and maintains an optimal location of the antenna annular assembly within a tire cavity.

According to a further aspect of the invention, a method is provided for associating a loop antenna with a tire comprising the steps: assembling a conductive ribbon antenna; attaching the ribbon antenna to a strength member, and attaching the antenna and strength member assembly into a pneumatic tire.

The advantages of the invention, which will be apparent to those skilled in the art, are achieved by preferred and alternative embodiments that are described in detail below and illustrated by the accompanying drawings.

DETAILED DESCRIPTION OF THE INVENTION

A tire pressure monitoring system typically consists of a transponder having one or more sensors. The transponder and associated electronics are housed within a package. In order to send or receive RF signals, a transponder must have an antenna. The antenna is preferably annular in configuration in the subject invention but may have alternative shapes if desired. The antenna may either be incorporated into the tire during manufacture or affixed to the tire by way of a post manufacture procedure. As used herein, an "annular antenna" may be circular, oblong, symmetrical, or asymmetrical without departing from the subject inventive principles. However, the preferred configuration of the antenna is circular and sized to overlap the tire sidewall region to which it attaches. The antenna may comprise a single wire or a plurality of strands. As explained below, the present invention deploys a conductive tinsel configuration in the formation of an antenna. Various commercially available transponders, sensors, and other electrical devices deployed in combination with an annular antenna formed from conventional conductive materials are suitable for use in conformance with the principles of the subject invention. Acceptable materials for the antenna wire include steel, aluminum, copper, copper alloys or other electrically conducting wire.

Figure 1:
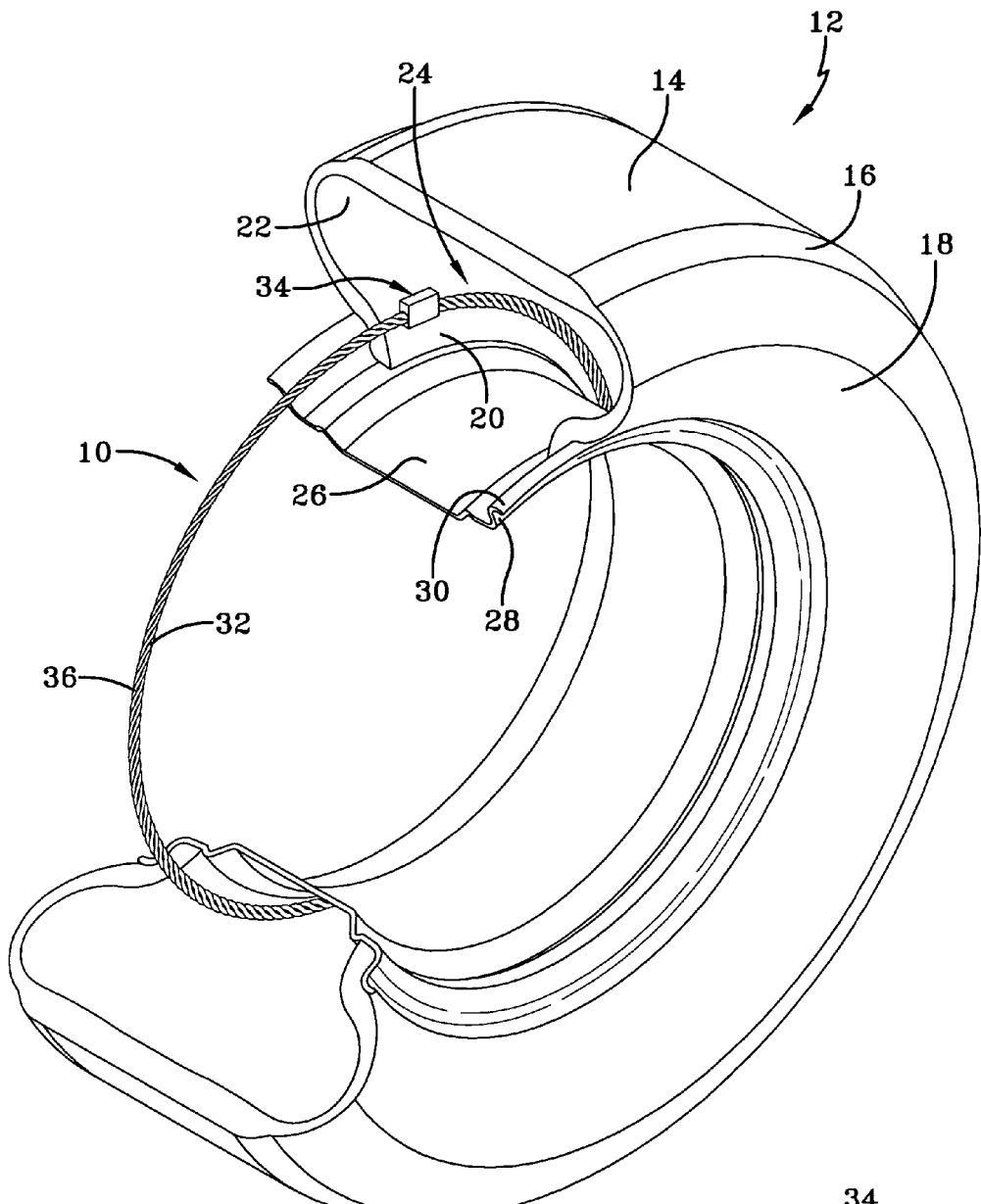
FIG. 1 is a perspective view of a tire and the subject annular apparatus with portions of the tire removed for the purpose of illustration.

Referring initially to FIG. 1, a preferred embodiment 10 of the subject invention is shown deployed within a tire 12. The tire 12 is formed from conventional materials such as rubber or rubber composites by conventional means and may comprise a radial ply or bias ply configuration. A typical tire 12 is configured having a tread 14, a shoulder 16, an annular sidewall 18, and a terminal bead 20. An inner liner 22 is formed and defines a tire cavity 24. The tire 12 is intended for mounted location upon an annular rim 26 having a peripheral rim flange and an outer rim flange surface 30. Rim 26 is conventionally configured and composed of a suitably strong metal such as steel.

An annular antenna, indicated generally at 32, is provided and, in the preferred embodiment, embodies on or more tinsel conductor(s) 32 wrapped or otherwise surrounding a strength member 36. Tinsel antenna 32 may be wrapped in alternative configurations around the strength member 36 as explained below.

With continued reference to FIG. 1, a transponder module 34 of the general type described above is provided and may include means for sensing tire parameters such as pressure and temperature. Included as part of the apparatus 10 is a strength member of elastic material 36 formed preferably but not necessarily into the annular configuration shown. Strength member 36 is formed of electrically insulating, elastic material as will be described below. In the post manufacturing state, therefore, the apparatus 10 comprising antenna 32, transponder module 34, and strength member 36 represents a unitary, generally circular, assembly that is readily transportable and handled for attachment to tire 12. The diameter of the apparatus assembly 10 is a function of the size of the tire 12 and the preferred attachment location thereon.

In reference to FIG. 1, the apparatus 10 is affixed to liner 22 of the tire 12 either during manufacture of the tire or, as preferable, in a post-manufacture assembly operation. Attachment may be by means of an adhesive or the apparatus may be embedded into the tire itself during manufacture.

Figure 2:
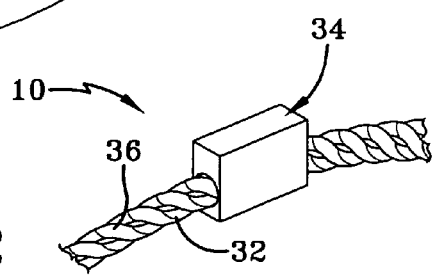
FIG. 2 is an enlarged schematic view of a portion of an antenna apparatus incorporating a conductive ribbon antenna as a spiral wrap surrounding an elastic strength member pursuant to the invention.
Figure 3:
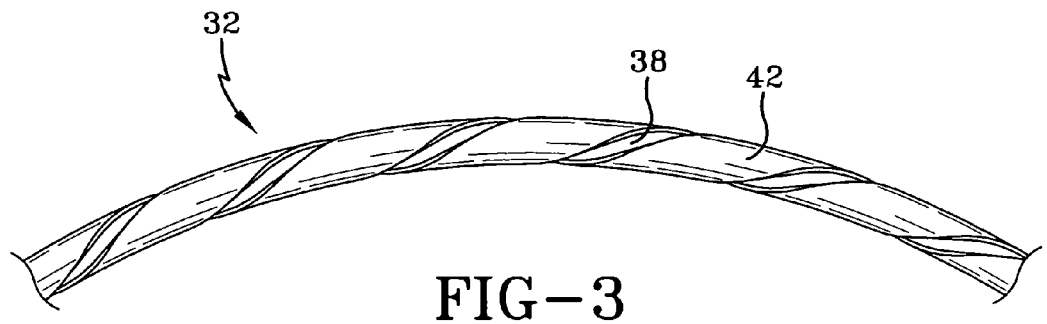
FIG. 3 is a side perspective view of an antenna apparatus segment in a spiral wrap configuration.

With reference to FIG. 3, a tinsel conductor is made by initially rolling a round conductive wire into a flat ribbon 40. One or more ribbons are then closely spiraled around a textile strength member 38 to make a tinsel strand 32. The spacing of the tinsel ribbon wraps 40 in FIG. 3 is widened for the purpose of clarity. It is preferred, although not necessary, to wrap the tinsel ribbon 40 around the strength member 38 in a manner leaving no gap between adjacent wraps. The strand 32 thus comprises a metallic elongating cord that has sufficient elasticity to allow for repeated elongation and constriction cycles. Several strands 32, 36 may then be twisted together as shown in FIGS. 1 and 2 to form a complete tinsel conductor. The selection of the number of strands used to make the complete tinsel conductor is related to the required resistance and impedance of the antenna. Cables containing 7 to 19 strands are typical, but not limited thereto. Such conductors exhibit excellent flexibility and flex-fatigue endurance. For use as an antenna, the flexibility and flex-fatigue endurance characteristics result in high durability and the capacity to withstand stresses associated with tire manufacture and tire use.

Rolling a round wire into a flat ribbon increases flexibility since resistance to bending is proportional to the dimension in the plane of bending. Increasing flexibility is highly desirable in an annular antenna construction for use in a tire. Secondly, with less bending force, the resultant reduction in energy is translated into improved resistance to flex fatigue. Spiraling the ribbon around a textile member creates multidirectional flexibility while adding tensile strength of the textile to the structure.

The textile strength member provides break strength resistance. Polyester, nylon, cotton, Kevlar, Spandex, and other known materials common to the industry may be used. The textile strength member selection should be chosen on the amount of elongation required. Partially oriented textiles such as nylon and polyester can elongate by about 10%. Others such as cotton and Kevlar elongate very little, while Spandex fabric has tremendous elongation. Further, textile fibers can be twisted to increase their elongation. For example, Kelvar at high twist structure can approach 8% elongation and polyester can be up to or exceeding 20%. Other elastomers can also be incorporated with the strength member, such as rubber or conductive rubber, to increase the antenna longevity and performance. Conductor materials commonly available include but are not limited to copper and alloys thereof. The ribbons may be bare or electro-plated with silver or tin. Tin and silver facilitate soldering of the conductor to an electronics package situated between terminal ends of the antenna assembly. The choice of material for the strength member may affect the ease to which the ends of the tinsel conductor can be soldered to the electronic package. Tinsel cables may be formed having impedance as low as 15 to 200 ohms/foot. Elongation can approach 20 percent depending on the textile or mixed textile strength member composition. If a material such as Spandex is utilized, elongation is significantly enhanced.

Figure 4:
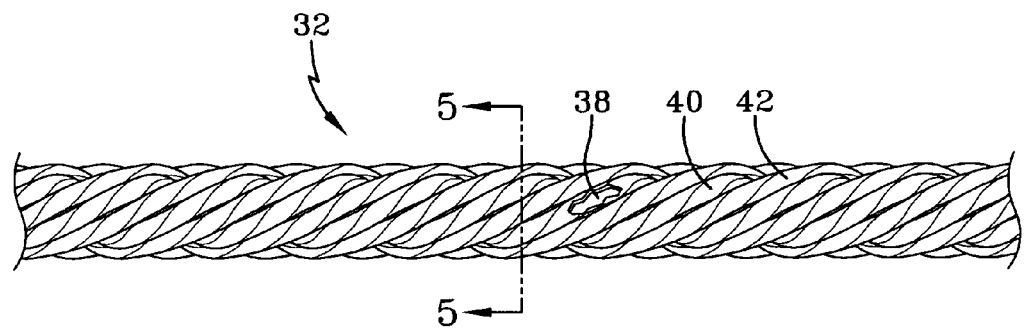
FIG. 4 is a side perspective view of an antenna apparatus segment in an alternative braid wrap configuration.
Figure 5:
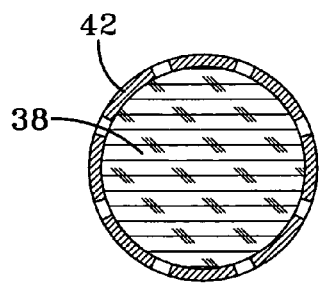
FIG. 5 is a transverse section view through antenna segment of FIG. 4 taken along the line 5—5.

FIG. 4 shows an alternative embodiment in which two conductive tinsel ribbons 40, 42 are inter-weaved around a strength member core 38 in braided fashion. Typically more than two small ribbons are used to from the braid. The configuration demonstrates good conductivity; acceptable flex-fatigue characteristics; and an acceptable level of elongation. So configured, the antenna cable can stretch, dependent on the textile strength member used, and contract to its original form in response to forces imposed therein due to the tire building process or through the use of the tire on a vehicle. As shown in FIGS. 1 and 2, the tinsel wrapped strands 32, 34 may be twisted to form the antenna cable. The invention is not limited by the number of strands employed in the formation of the antenna cable. One strand 32, 34 may be used alone if desired in the forming of the antenna cable or more than two strands combined in a twist or otherwise may be employed. Additionally, while only one antenna cable is shown, several antenna cables may be deployed around the tire liner at respective regions if desired. The antenna cable is electrically and mechanically connected to the transponder package 34 in a conventional manner.

From the foregoing, it will be appreciated that the subject invention satisfies the need of the industry for a convenient, reliable method of affixing an antenna in annular form to the inside of a tire. Use of an elongating textile as a strength member surrounded by a conductive ribbon conductor is economical and highly effective. The textile strength member extends from an initial relaxed state into a stretched stressed condition when the stresses within a tire are imposed; the material of the substrate and the curvilinear configuration of the antenna accommodating such an elongation. The recovery of the strength member to its original form is predictable, and durable enough to withstand the necessary number of elongation/recovery cycles within a typical tire used in an intended manner. LYCRA SPANDEX (registered trademark of E. I. DuPont de Nemours & Company), for example, is one material that may be employed. Other commercially available stretch fabrics may also be utilized. Such fabrics are available having a selection of stretch resistance, stress decay, hysteresis, residual stretch, and recovery characteristics. Materials will generally have a cycle limit, representing the greatest elongation to which the material may be subjected without resulting in a permanent deformation. The holding power and stretch resistance may further be selected to provide an optimum match between the elasticized characteristics of the strength member 36 and the magnitude of elongation resulting from stresses a tire environment.

The advantages of the subject invention over antenna apparatus composed of a rubber carrier strip are significant. Spandex fiber construction can be stretched repeatedly and still recover to very near original length and strength; the material may be stretched through a high number of cycles without breaking; the material is stronger, more durable and exhibits a higher retroactive force than rubber. Moreover, elasticized textile fabric such as Spandex is lightweight, supple and may be formed into a wide variety of shapes.

While the above sets forth a preferred embodiment and alternative embodiments of the subject invention, the invention is not intended to be so limited. Other embodiments that will be apparent to those skilled in the art and which utilize the teachings herein set forth, are intended to be within the scope and spirit of the present invention.

What is claimed is:

1. An apparatus for a tire comprising:
   an elongate antenna cable comprising at least one conductive strand, the strand comprising a tinsel ribbon of conductive material at least partially surrounding an elongate strength member;
   the elongate strength member being formed of non-conductive extensible material surrounded by and attached to the tinsel ribbon to maintain the tinsel ribbon in a preferred configuration, the antenna cable attaching to an inward wall of the tire and extending from an initial relaxed state to an extended state when subjected to stresses within the tire and substantially recovering from the extended state in the absence of said stresses.

2. An apparatus according to claim 1, wherein the strength member is composed substantially from an elastic fiber material.

3. An apparatus according to claim 2, wherein the antenna cable comprises a plurality of strands interwoven together, each strand having a tinsel ribbon outer sheath of substantially flat sectional configuration.

4. An apparatus according to claim 3, wherein the tinsel ribbon is at least partially spirally wrapped around the strength member to form a strand.

5. An apparatus according to claim 3, wherein a plurality of tinsel ribbons are braided around the strength member to form a strand.

6. A tire having an antenna assembly incorporated therein, the tire comprising:
   a tire body having an inward facing wall;
   an elongate antenna cable comprising at least one conductive strand, each strand comprising an elongate strength member at least partially surrounded by a tinsel ribbon;
   the elongate strength member being formed of non-conductive elastic material surrounded by and attached to the tinsel ribbon to maintain the tinsel ribbon in a preferred configuration, the antenna attaching to an inward wall of the tire and extending from an initial relaxed state to an extended state when subjected to stresses within the tire and substantially recovering from the extended state in the absence of said stresses.

7. A tire according to claim 6, wherein the strength member is composed substantially from an elastic fiber material.

8. A tire according to claim 6, wherein each tinsel ribbon has a substantially flat sectional configuration.

9. A tire according to claim 6, wherein a tinsel ribbon at least partially spirally wraps around a strength member to form a strand.

10. A tire according to claim 6, wherein a plurality of tinsel ribbons at least partially wraps around a strength member in a braid pattern to form a strand.

11. A method for mounting an annular antenna and transponder to a tire, comprising the steps:
   forming a conductive strand comprising an elongate strength member at least partially surrounded by a conductive tinsel ribbon;
   forming an antenna
   forming a conductive strand by at least partially surrounding an elongate strength member by a conductive tinsel ribbon having a substantially flat sectional profile; the strength member being composed of elastic material that extends from an initial relaxed state to an extended state when subjected to stresses within the tire and substantially recovers from the extended state in the absence of said stresses to maintain the strand in a preferred configuration;

forming an annular antenna cable from at least one of the conductive strands; and attaching the cable to an inward wall of a tire.

12. A method according to claim 11 comprising the further step of forming the strength member from at least one textile fabric strip woven from an elastic fiber material.

13. A method according to claim 12 comprising the further step of forming the antenna cable from a plurality of conductive strands.

14. A method according to claim 13 comprising the further step of forming the conductive strand by spirally wrapping at least one tinsel ribbon at least partially around a strength member.

* * * * *